United States Patent
Honda et al.

(10) Patent No.: US 10,530,227 B2
(45) Date of Patent: Jan. 7, 2020

(54) MANUFACTURING METHOD OF ROTOR CORE, MANUFACTURING METHOD OF ROTOR, ROTOR AND MOTOR

(71) Applicant: Nidec Corporation, Kyoto (JP)

(72) Inventors: Takeshi Honda, Kyoto (JP); Yosuke Yamada, Kyoto (JP); Yasuaki Nakahara, Kyoto (JP); Hisashi Fujihara, Kyoto (JP); Takayuki Migita, Kyoto (JP); Tsuyoshi Nakamura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 350 days.

(21) Appl. No.: 15/158,699

(22) Filed: May 19, 2016

(65) Prior Publication Data

US 2016/0352199 A1 Dec. 1, 2016

Related U.S. Application Data

(60) Provisional application No. 62/168,163, filed on May 29, 2015.

(30) Foreign Application Priority Data

Nov. 2, 2015 (JP) ................................. 2015-216132

(51) Int. Cl.
*H02K 15/12* (2006.01)
*H02K 1/28* (2006.01)
*H02K 15/03* (2006.01)

(52) U.S. Cl.
CPC .............. *H02K 15/12* (2013.01); *H02K 1/28* (2013.01); *H02K 15/03* (2013.01); *Y10T 29/49012* (2015.01)

(58) Field of Classification Search
CPC . H02K 1/28; H02K 1/30; H02K 15/12; Y10T 29/49012
See application file for complete search history.

(56) References Cited

U.S. PATENT DOCUMENTS 3,979,821 A * 9/1976 Noodleman ......... H02K 13/006
148/108
6,734,596 B1 5/2004 Liao
(Continued)

FOREIGN PATENT DOCUMENTS

JP 59-72968 A 4/1984
JP 10-127015 A 5/1998
(Continued)

OTHER PUBLICATIONS

Nakahara et al., "Method of Manufacturing Rotor, Rotor, and Motor", U.S. Appl. No. 16/318,785, filed Jan. 18, 2019.

*Primary Examiner* — Livius R. Cazan
(74) *Attorney, Agent, or Firm* — Keating & Bennett

(57) ABSTRACT

A manufacturing method comprising: a process S1 of forming a plate member which has a substantially annular scrap portion having a center hole through an axial direction and a core plate portion defining a portion of the core pieces arranged continuously with the scrap portion on a radially inner side of the scrap portion; a process S2 of forming a laminated body, which has the core pieces, by laminating the plate member; a process S3 of providing the laminated body and the shaft in a mold; a process S4 of forming a molding body by inserting a molten resin or a nonmagnetic material in the mold and forming the filling portion of which at least a portion is located between the core pieces; and a process S5 of separating the scrap portion and the core plate portion.

9 Claims, 14 Drawing Sheets

(56) References Cited

U.S. PATENT DOCUMENTS

| | | |
|---|---|---|
| 7,667,367 B2 | 2/2010 | Matsuo et al. |
| 8,683,675 B2 | 4/2014 | Yuya et al. |
| 2013/0119808 A1 | 5/2013 | Hirokawa et al. |

FOREIGN PATENT DOCUMENTS

| | | | |
|---|---|---|---|
| JP | 2003-102136 A | 4/2003 | |
| JP | 2004-215474 A | 7/2004 | |
| JP | 2006-121807 A | 5/2006 | |
| JP | 2007-295668 A | 11/2007 | |
| WO | 2010/082465 A1 | 7/2010 | |
| WO | WO 2014163293 A1 * | 10/2014 | ............. H02K 1/276 |

* cited by examiner

MANUFACTURING METHOD OF ROTOR CORE, MANUFACTURING METHOD OF ROTOR, ROTOR AND MOTOR

CROSS REFERENCE TO RELATED APPLICATION

The present disclosure claims priority under 35 U.S.C. § 119 to U.S. Application No. 62/168,163 filed on May 29, 2015 and Japanese Application No. 2015-216132 filed on Nov. 2, 2015, the entire content of which is incorporated herein by reference.

FIELD OF THE DISCLOSURE

The present disclosure relates to a manufacturing method of a rotor core, a manufacturing method of a rotor, the rotor and a motor.

DESCRIPTION OF THE RELATED ART

In the past, a spoke type motor has been known. A rotor of this type of motor includes a plurality of insertion type denticles.

In such a motor, the plurality of insertion type denticles are desirably fixed by being integrally molded with resin. However, in this case, the resin needs to be flown while the insertion type denticles are retained by a mold, a jig or the like. For that reason, it results in bad workability and takes a long time to manufacture the rotor.

SUMMARY OF THE DISCLOSURE

An exemplary embodiment according to the present disclosure is a manufacturing method of a rotor core comprising a shaft arranged along a vertically extending center axis, a plurality of core pieces separately arranged to one another on a radially outer side of the shaft along a circumferential direction, and a filling portion which covers at least a portion of the core piece, the method comprising: a process S1 of forming a plate member which has a substantially annular scrap portion having a center hole through an axial direction and a core plate portion defining a portion of the core pieces arranged continuously with the scrap portion on a radially inner side of the scrap portion; a process S2 of forming a laminated body, which has the core pieces, by laminating the plate member; a process S3 of providing the laminated body and the shaft in a mold; a process S4 of forming a molding body by flowing a molten resin or a nonmagnetic material in the mold and forming the filling portion of which at least a portion is located between the core pieces; and a process S5 of separating the scrap portion and the core plate portion.

An exemplary embodiment according to the present disclosure is a manufacturing method of a rotor comprising a rotor core manufactured by said manufacturing method of the rotor core, a plurality of permanent magnets which magnetize the core pieces, and a sensor magnet which is indirectly or directly fixed to the shaft, the method comprising: a process S6 of forming a second groove which is concaved radially inward on an outer circumferential surface of the shaft after the process S4 is performed; and a process S7 of attaching the sensor magnet to a position in which the second groove is formed on the shaft after the process S6 is performed.

An exemplary embodiment according to the present disclosure is a rotor, comprising: a rotor core which has a shaft arranged along a vertically extending center axis, a plurality of core pieces separately arranged to one another on a radially outer side of the shaft along a circumferential direction, and a filling portion which covers at least a portion of the core piece; and a plurality of permanent magnets which magnetize the core pieces, and the core pieces have a plurality of plate-shaped core plate portions laminated in an axial direction, and the core plate portions have a concave portion which is recessed radially inward from a radially outer end portion.

An exemplary embodiment according to the present disclosure is a motor comprising: a stator; and a rotor which is capable of relatively rotating on a center axis with respect to the stator.

The above and other elements, features, steps, characteristics and advantages of the present disclosure will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
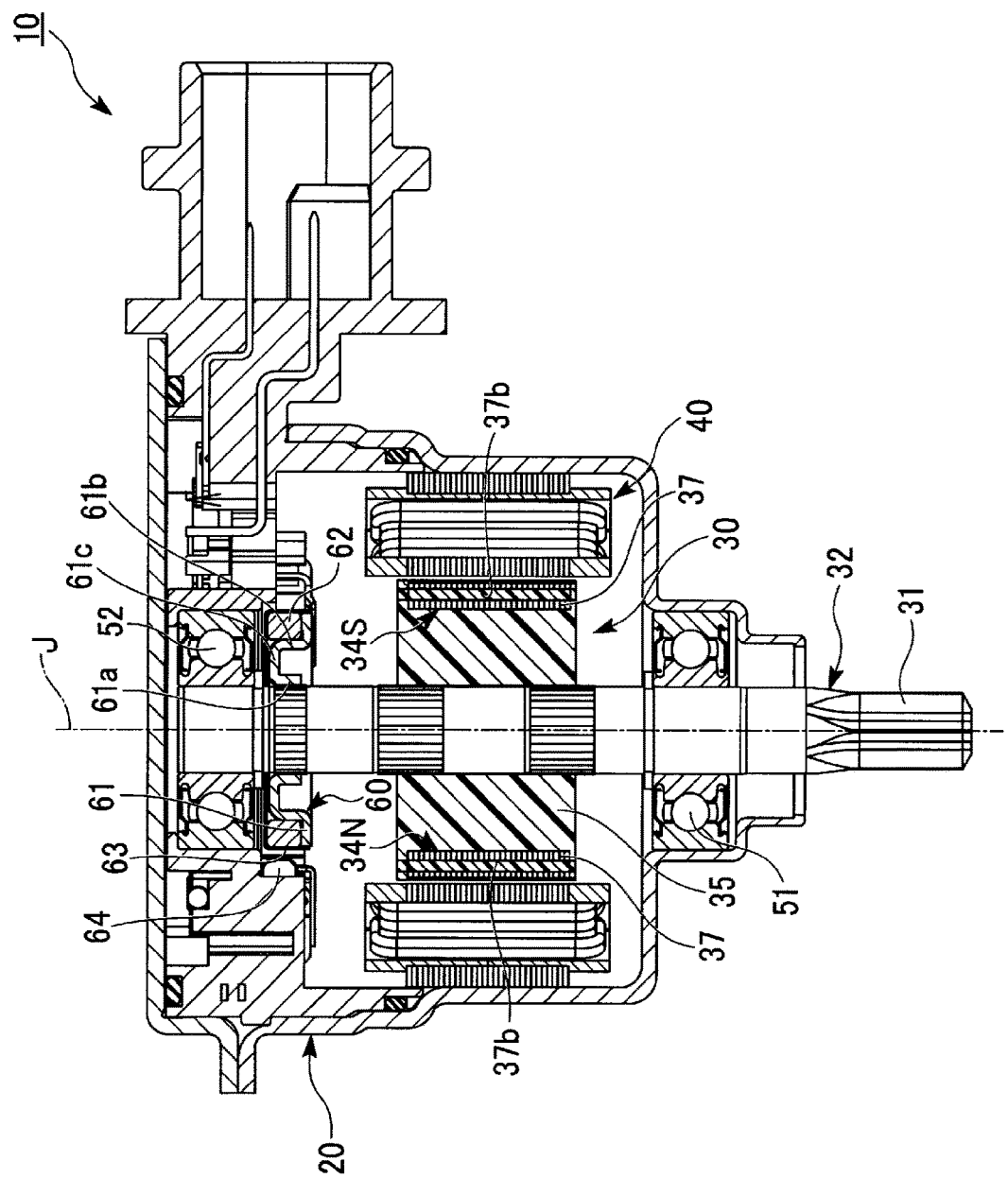
FIG. 1 is a cross-sectional view which illustrates a motor in the present exemplary embodiment.
Figure 2:
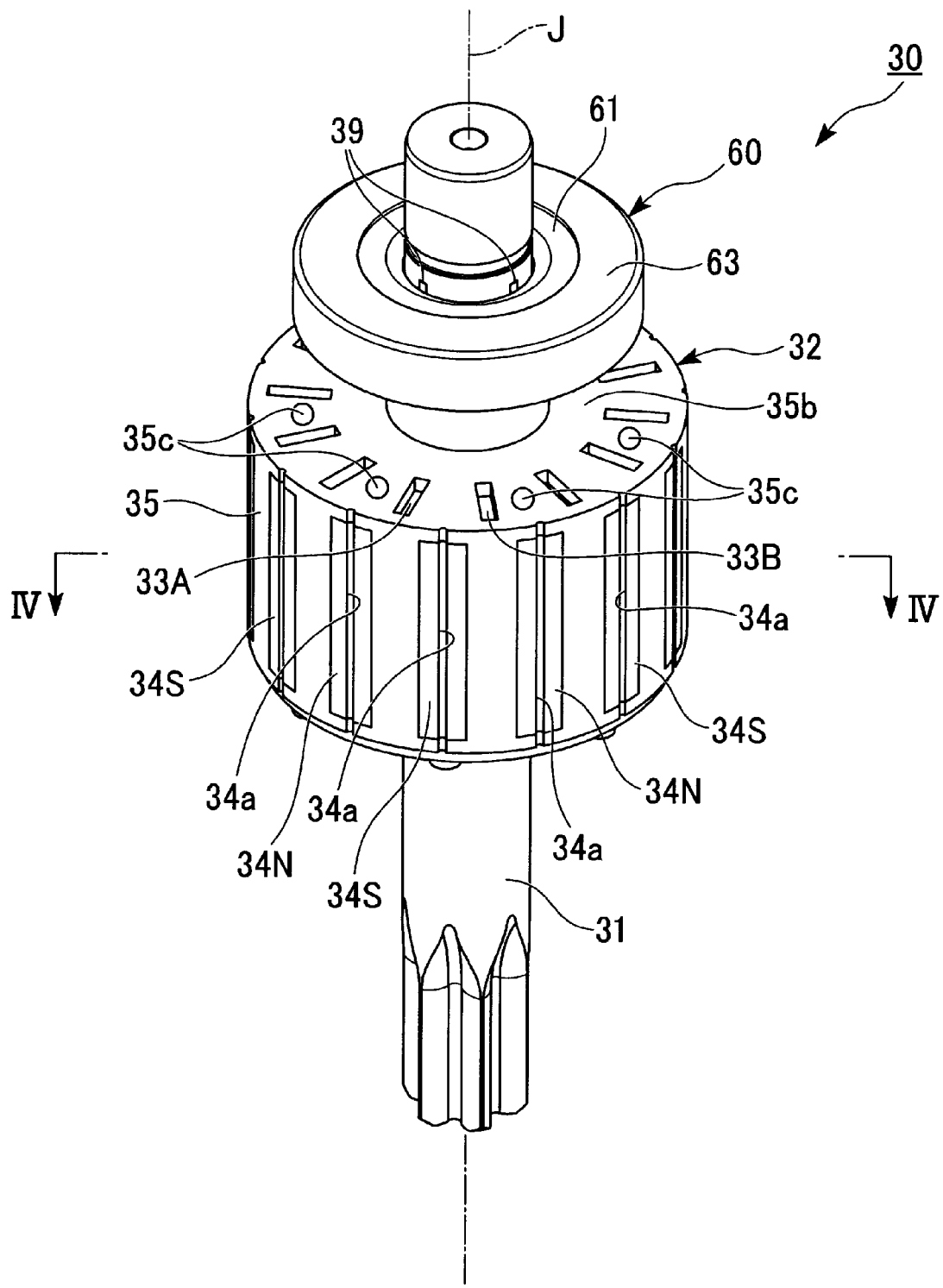
FIG. 2 is a perspective view which illustrates a rotor in the present exemplary embodiment.
Figure 3:
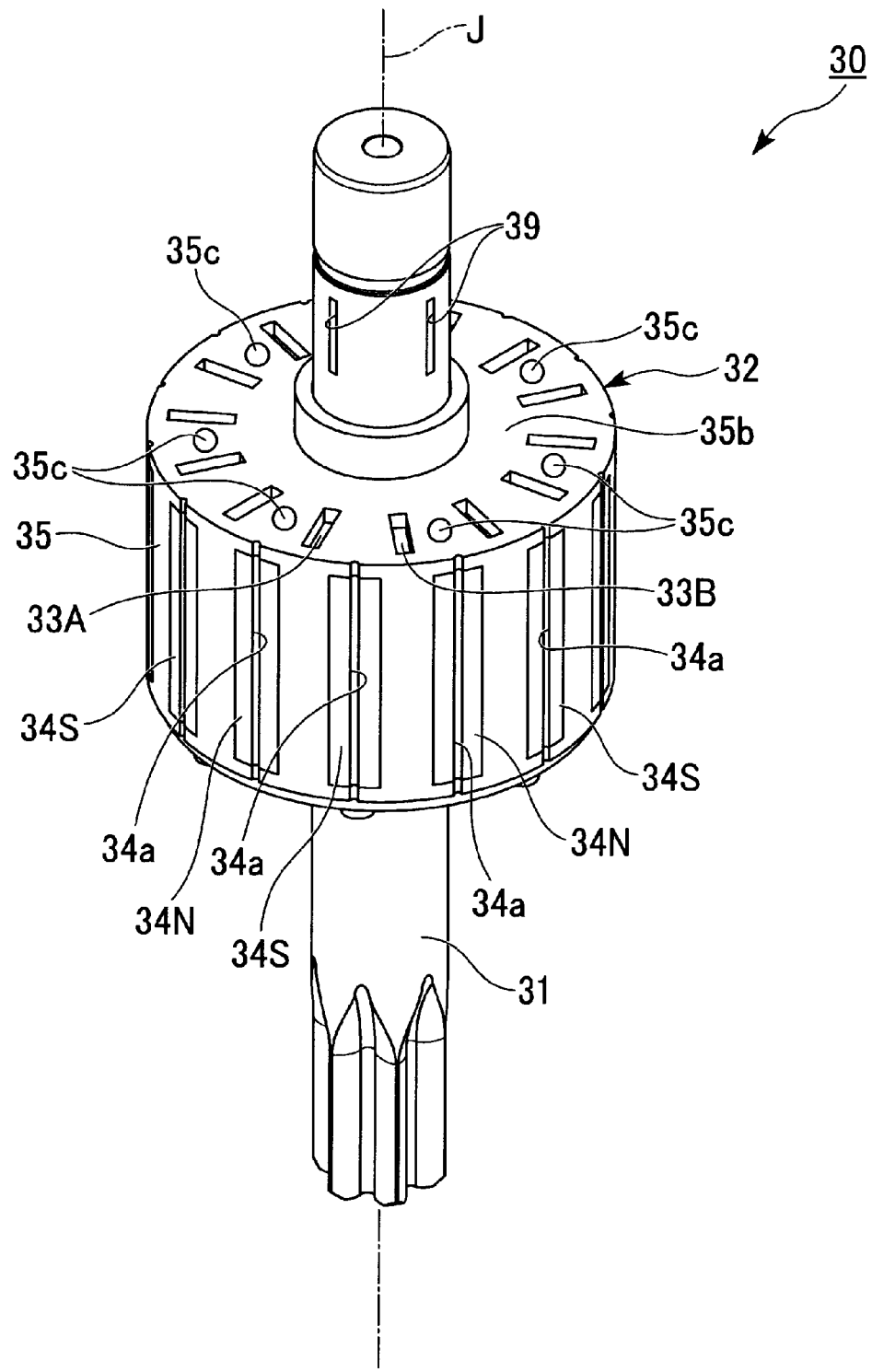
FIG. 3 is a perspective view which illustrates the rotor in the present exemplary embodiment.
Figure 4:
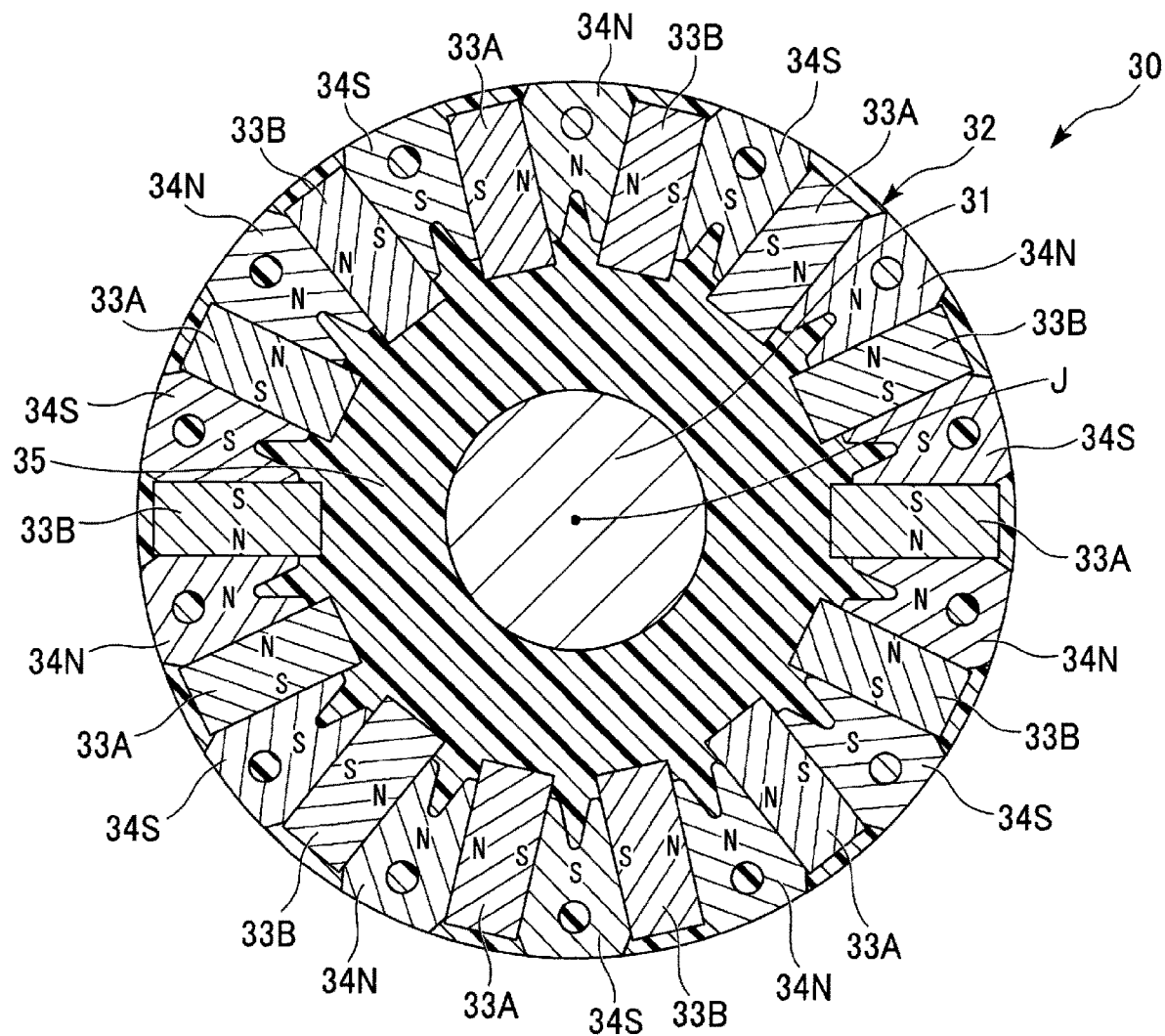
FIG. 4 is a diagram which illustrates the rotor in the present exemplary embodiment and a cross-sectional view taken along an IV-IV line of FIG. 2.

Hereinafter, a motor according to the preferred exemplary embodiment of this present disclosure will be explained with reference to the drawings. FIG. 1 is a cross-sectional view which illustrates a motor 10. FIG. 2 is a perspective view illustrating a rotor 30. FIG. 3 is a perspective view which illustrates the rotor 30. FIG. 4 is a diagram which illustrates the rotor 30 in the exemplary embodiment and a cross-sectional view taken along an IV-IV line of FIG. 2.

As shown in FIG. 1 to FIG. 3, the motor 10 includes the rotor 30, a stator 40, a plurality of bearings 51 and 52 and a housing 20. The motor 10 includes a rotation sensor 64 which detects a rotation position of the rotor 30.

The rotor 30 is a so-called spoke type rotor. The rotor 30 can relatively rotates on a vertically center axis J with respect to the stator 40. The rotor 30 has a rotor core 32, a plurality of permanent magnets 33A and 33B and a sensor assembly 60. The sensor assembly 60 has a sensor yoke 61, a sensor magnet 62 and a magnet cover 63 which covers the sensor magnet 62. Further, in FIG. 3, illustration of the sensor assembly 60 is omitted.

As shown in FIG. 4, the rotor core 32 has a shaft 31, a filling portion 35 and a plurality of core pieces 34N and 34S. The rotor core 32 is formed by molding, for example, in which the core pieces 34N and 34S are arranged in a mold and molten resin or a nonmagnetic material is flown therein.

Figure 5:
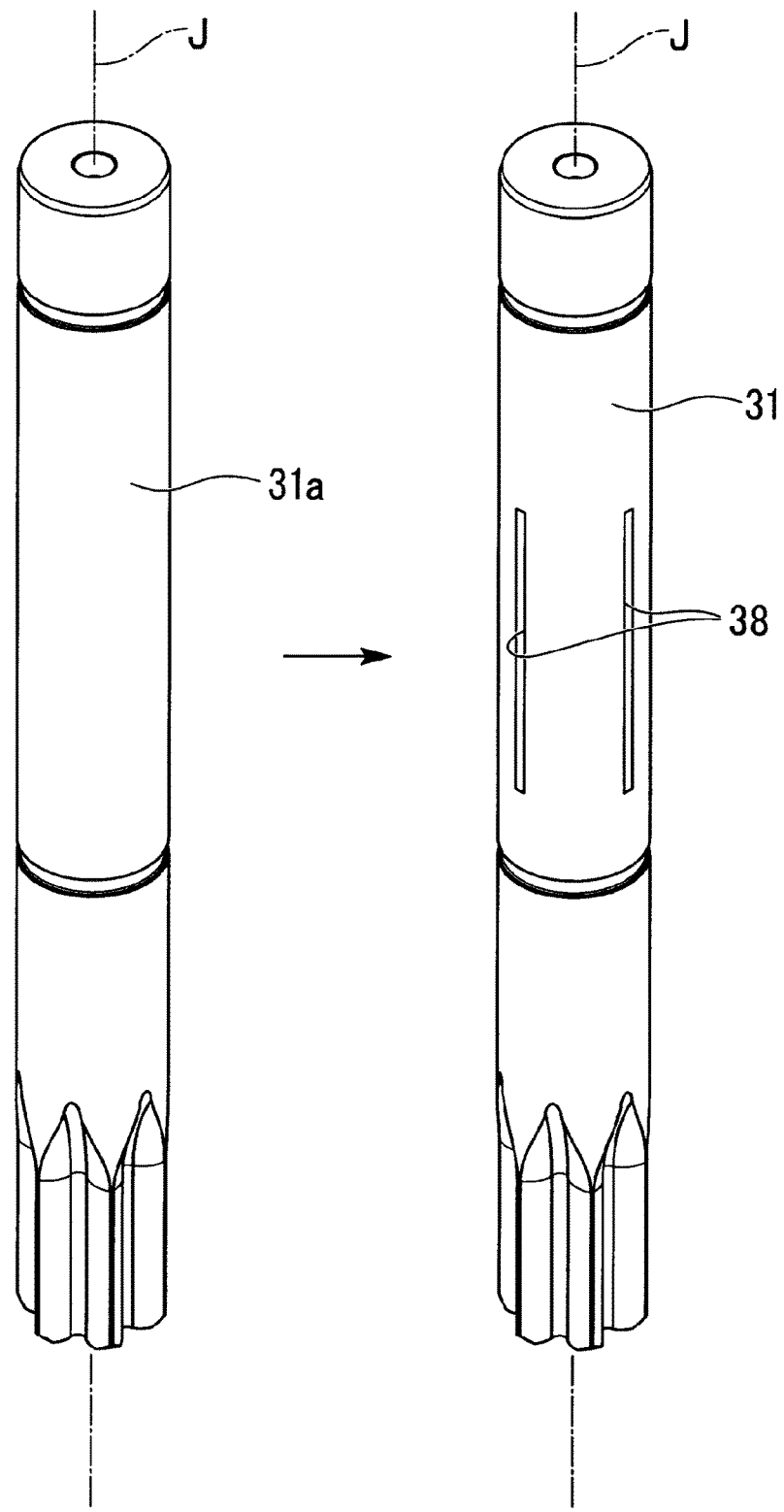
FIG. 5 is a perspective view which illustrates a shaft in the present exemplary embodiment.

FIG. 5 is a perspective view which illustrates the shaft 31. The shaft 31 is arranged along the center axis J. In the preferred exemplary embodiment, the shaft 31 is a member having a columnar shape. The shaft 31 may be a solid type member or a hollow type cylindrical member. As shown in FIG. 5, an outer circumferential surface of the shaft 31 has a plurality of first grooves 38 which are concaved radially inward. The first grooves 38 respectively extend in an axial direction. The plurality of first grooves 38 are arranged in a circumferential direction. The plurality of first grooves 38 are formed, for example, by stacking. Further, the first grooves 38 may be formed by any other processing methods.

As shown in FIG. 3, the shaft 31 has a plurality of second grooves 39, which are concaved radially inward, on the outer circumferential surface thereof. The second grooves 39 extend in the axial direction. The plurality of second grooves 39 are arranged along the circumferential direction. The second grooves 39 are respectively arranged on an upper side than the filling portion 35. The second grooves 39 are formed, for example, by stacking. Further, the second grooves 39 may be formed by any other processing methods.

As shown in FIG. 4, the filling portion 35 is arranged on a radially outer side of the shaft 31 in the rotor 30. The filling portion 35 is fixed to the outer circumferential surface of the shaft 31. More specifically, the filling portion 35 is fixed to a position, in which the first grooves 38 are arranged, on the outer circumferential surface of the shaft 31. In other words, the first grooves 38 are arranged in a position to which the filling portion 35 is contacted.

At least a portion of the filling portion 35 is arranged between the plurality of core pieces 34N and 34S. The filling portion 35 covers at least a portion of the core pieces. The plurality of core pieces 34N and 34S are retained by the filling portion 35. In the present exemplary embodiment, the filling portion 35 is made of resin. Further, the filling portion 35 may be made of, for example, the nonmagnetic material instead of the resin. The filling portion 35 may be made of, for example, aluminum, stainless steel SUS or the like which is the nonmagnetic material.

Further, the description that "at least the portion of the filling portion is arranged between the plurality of core pieces" includes the case in which at least the portion of the filling portion is positioned on a line that connects any two core pieces of the plurality of core pieces. "The any two core pieces of the plurality of core pieces" are not particularly limited, and they may be two circumferentially neighboring core pieces, or two core pieces which face each other in a radial direction across the shaft 31. In FIG. 4, the portion of the filling portion 35 is positioned between the neighboring core pieces 34N and 34S in the circumferential direction.

On a lower surface of the filling portion 35, there provided is a plurality of magnet insertion cavities (not illustrated), through which the permanent magnets 33A and 33B are inserted. The plurality of magnet insertion cavities is arranged between the core piece 34N and the core piece 34S in the circumferential direction.

As shown in FIG. 2 and FIG. 3, the filling portion 35 has a lid portion 35b which covers an upper side of the core pieces 34N and 34S. In the exemplary embodiment, the lid portion 35b has a circular shape having its center on the center axis J in an axial view. On an upper surface of the lid portion 35b, at least one of gate marks 35c is provided. In FIG. 2 and FIG. 3, a plurality of gate marks 35c is provided on the upper surface of the lid portion 35b. The respective gate marks 35c are arranged in the circumferential direction at regular intervals. The number of the gate marks 35c provided in this exemplary embodiment is seven. The number of the gate marks 35c is identical to that of gates G that will be described in more detail in a subsequent section. The gate mark 35c is arranged, for example, between the circumferentially neighboring magnet insertion cavities. The gate marks 35c are arranged on an upper portion of the core pieces 34N and 34S.

As shown in FIG. 4, the core pieces 34N and 34S are separately arranged along the circumferential direction on the radially outer side of the shaft 31. The core piece 34N and the core piece 34S are alternately arranged along the circumferential direction. The core piece 34N is magnetized to an N-pole by the permanent magnets 33A and 33B. The core piece 34S is magnetized to an S-pole by the permanent magnets 33A and 33B.

In the present exemplary embodiment, the core pieces 34N and 34S are connected to each other only by the filling portion 35. That is, other than the filling portion 35, the rotor 30 does not have any other portions to connect the core pieces 34N and 34S to each other, and the core pieces 34N and 34S are separated. For that reason, when the rotor core 32 is formed by molding, for example, the molten resin or the nonmagnetic material easily flows between the core pieces 34N and 34S in the mold.

Generally, many of the spoke type rotors have a connection portion which connects the core pieces and the shaft or a connection portion which connects the plurality of core pieces. However, in the rotor 30 of the preferred exemplary embodiment, the connection portion does not exist. For that reason, it is difficult for magnetic flux which flows out from the permanent magnets 33A and 33B to flow on a radially inner side than the core pieces 34N and 34S. With this, the magnetic flux, which flows out from the permanent magnets 33A and 33B, mostly flows on a radially outer side of the core pieces 34N and 34S. As a result, a ratio of the magnetic flux which contributes to a torque of the motor 10 can be increased, and the torque of the motor 10 can be further increased.

In the present exemplary embodiment, the number of the core pieces 34N is, for example, seven. The number of the core pieces 34S is, for example, seven. That is, the number of the core pieces 34N is identical to that of the core pieces 34S.

The structures of the core piece 34N and the core piece 34S are identical, except that the magnetized magnetic poles by the permanent magnets 33A and 33B are different from each other. For that reason, in the following descriptions, the core pieces 34N may be sometimes explained as a representation of the core pieces, and explanations related to the core pieces 34S may be omitted.

Figure 6:
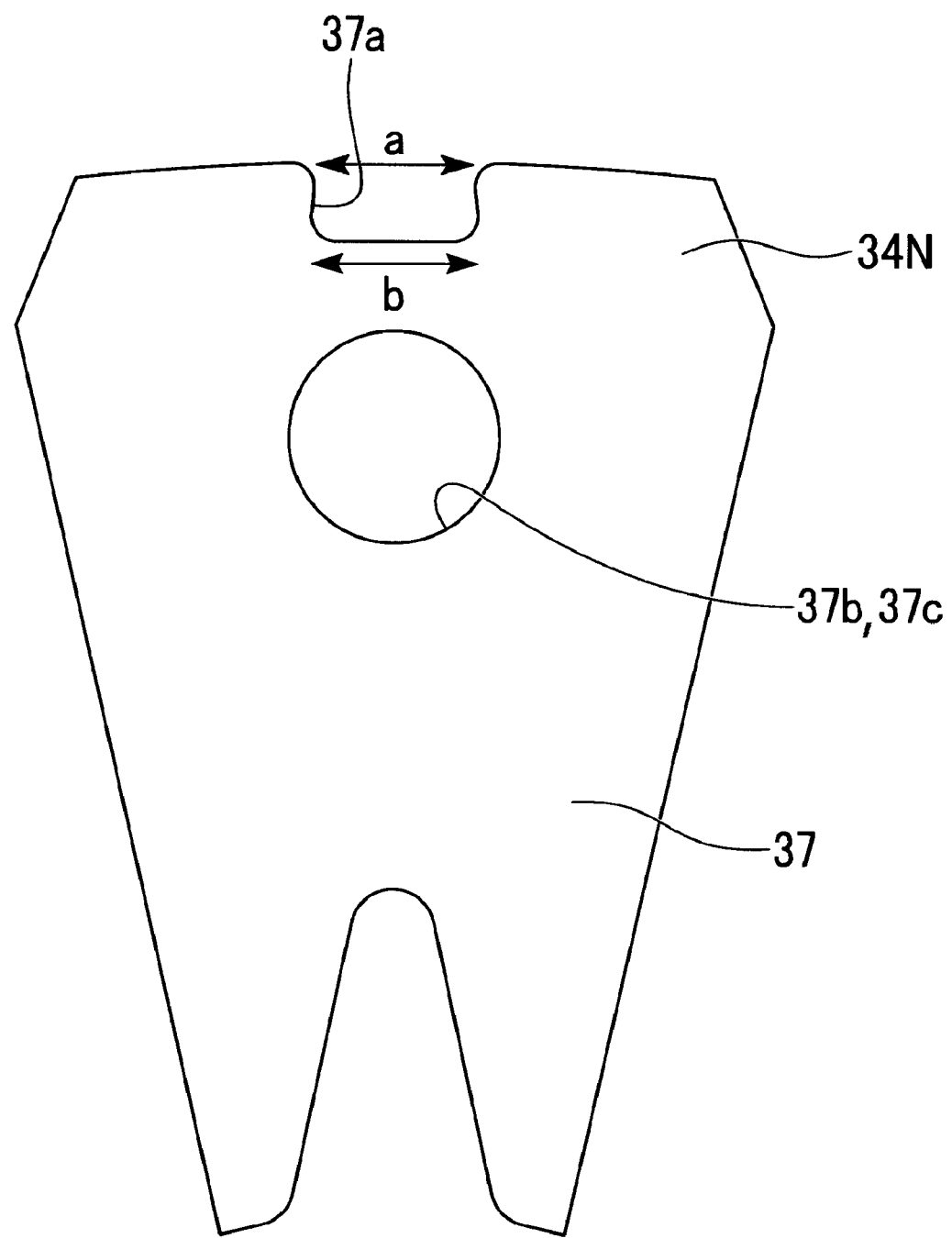
FIG. 6 is a top view which illustrates a core piece in the present exemplary embodiment.

As shown in FIG. 4 and FIG. 6, the core piece 34N has a substantially fan shape in which a circumferential width thereof is increased radially outward from the radially inner side. Corner portions on the radially outer side of the core piece 34N are chamfered in both circumferential directions. The chamfering on the radially outer side of the core piece 34N may be angular chamfering or round chamfering.

As shown in FIG. 1, the core piece 34N has a plurality of plate-shaped core plate portions 37 laminated in the axial direction. That is, the core plate portions 37 define a portion of the core pieces 34N. The core plate portions 37 are electromagnetic steel plates which are a type of a magnetic material.

As shown in FIG. 6, the core plate portion 37 has a second connection portion 37a which is a concave portion concaved in the radial direction. More specifically, the second connection portion 37a is the concave portion concaved radially inward from a radially outer end portion of the core plate portion 37. With this, a manufacturing method of the rotor core 32 and a manufacturing method of the rotor 30 which will be described in more detail in a subsequent section can be easily performed. That is, the rotor 30 and the motor 10 in the exemplary embodiment have structures in which manufacturing processes can be simplified.

A circumferential width a on a radially outer end portion of the second connection portion 37a is narrower than a circumferential width b on a radially inner end portion of the second connection portion 37a. That is, in the second connection portion 37a, a circumferential width on the radially inner side than the radially outer end portion of the second connection portion 37a is wider than a circumferential width of the radially outer end portion of the second connection portion 37a. As shown in FIG. 6, in a planar view, a contour of an inner side surface of the second connection portion 37a defines three sides of sides defining a substantially rectangular shape. The inner side surface of the second connection portion 37a is inclined, such that the circumferential width is increased radially inward from the radially outer side.

By laminating the core plate portions 37 in the axial direction, the second connection portions 37a of the respective core plate portions 37 are laminated. With this, as shown in FIG. 2 and FIG. 3, axially extending core concave portions 34a are formed on a radially outer end portion of the core pieces 34N.

As shown in FIG. 6, the core plate portion 37 has a core plate portion through hole 37c which penetrates the core plate portion 37 in the axial direction. The core plate portion through hole 37c has a circular shape in the axial view. Further, the shape of the core plate portion through hole 37c in the axial view is not limited thereto and may be an elliptic shape or a polygon shape.

As shown in FIG. 1, the core piece 34N has a core piece through hole 37b which penetrates the core piece 34N in the axial direction. The core piece through hole 37b is formed such that the plurality of the core plate portion through holes 37c are connected in the axial direction. A portion of the filling portion 35 is arranged in the core piece through hole 37b. For that reason, the core plate portions 37 can be fixed to each other by the filling portion 35.

As shown in FIG. 6, the core piece through hole 37b has a circular shape in the axial view. Further, the shape of the core piece through hole 37b is not limited thereto and may be an elliptic shape or a polygon shape. In the rotor 30, the core piece through hole 37b is arranged on the radially outer side than the gate marks 35c. That is, the gate marks 35c are radially positioned in different positions from the core piece through hole 37b.

As shown in FIG. 4, the permanent magnets 33A and 33B magnetize the core pieces 34N and 34S. The permanent magnets 33A and 33B have a rectangular parallelepiped shape which extends in the radial direction. The permanent magnets 33A and the permanent magnets 33B are alternatively arranged in the circumferential direction. The permanent magnets 33A and 33B are respectively arranged between the core pieces 34N and 34S in the circumferential direction.

The permanent magnets 33A and 33B respectively have two magnetic poles which are arranged along the circumferential direction. The permanent magnets 33A in the present exemplary embodiment have the N-pole on one side in the circumferential direction and the S-pole on the other side in the circumferential direction. The permanent magnets 33B have the S-pole on the one side in the circumferential direction and the N-pole on the other side in the circumferential direction. With this, the magnetic poles of the circumferentially neighboring permanent magnets 33A and 33B are arranged, such that magnetic poles with identical polarity face each other in the circumferential direction.

The core piece 34N is arranged between the N-pole of the permanent magnet 33A and the N-pole of the permanent magnet 33B. Accordingly, the core piece 34N is magnetized to the N-pole. The core piece 34S is arranged between the S-pole of the permanent magnet 33A and the S-pole of the permanent magnet 33B. Accordingly, the core piece 34S is magnetized to the S-pole.

The permanent magnet 33A and the permanent magnet 33B are configured in the same way, except that their arrangement of the magnetic poles in the circumferential direction is different from each other. For that reason, in the following descriptions, the permanent magnets 33A may be sometimes explained as a representation of the permanent magnets, and explanations related to the permanent magnets 33B may be omitted.

In this exemplary embodiment, the permanent magnet 33A is in direct contact with the core piece 34N and the core piece 34S which are arranged respectively on both sides in the circumferential direction. As a result, the permanent magnet 33A is attached to the core piece 34N and the core piece 34S by magnetic force. Further, the permanent magnet 33A may be in indirect contact with the core pieces 34N and 34S via a portion of the filling portion 35.

The permanent magnet 33A extends in the radial direction. A shape of a cross section perpendicular to the axial direction of the permanent magnet 33A is rectangular. The number of the permanent magnets 33A provided in the present exemplary embodiment is seven. The number of the permanent magnets 33B is seven. That is, the number of the permanent magnets 33A is identical to that of the permanent magnets 33B. In the preferred exemplary embodiment, the number of the permanent magnets 33A and 33B is identical to that of the core pieces 34N and 34S. Further, the number of the core pieces 34N and 34S can be appropriately altered to correspond to the number of the permanent magnets 33A and 33B. The number of the permanent magnets 33A and 33B may be appropriately altered according to the specification of the motor.

As shown in FIG. 1 and FIG. 2, the sensor yoke 61 is a member having a substantially cylindrical shape. The sensor yoke 61 is made of a magnetic material. The sensor yoke 61 has a substantially annular inner wall portion 61a, a substantially annular outer wall portion 61b and a top plate portion 61c. In the present exemplary embodiment, the inner wall portion 61a has a substantially circular ring shape. As shown in FIG. 1, the outer wall portion 61b is positioned on a radially outer side of the inner wall portion 61a and surrounds the inner wall portion 61a in the circumferential direction. That is, the sensor yoke 61 has a dual cylindrical shape. The top plate portion 61c has a substantially circular ring shape and connects an upper portion of the inner wall portion 61a and an upper portion of the outer wall portion 61b.

The shaft 31 is pressed into a through hole defined by the inner wall portion 61a. That is, the sensor yoke 61 is fixed to the shaft 31 by fixing an inner side surface of the inner wall portion 61a to an outer circumferential surface of the shaft 31. More specifically, the inner side surface of the inner wall portion 61a is fixed to a position in which second grooves 39 are provided on the outer circumferential surface of the shaft 31.

In the shaft 31, by providing the second grooves 39, an outer diameter of a portion between the respective second grooves 39 in the circumferential direction (refer to FIG. 3) is increased than an outer diameter of a portion in which the second groove 39 is provided. For that reason, when the shaft 31 is pressed to the sensor yoke 61, the portion between the respective second grooves 39 in the circumferential direction serve to press it. Accordingly, the sensor yoke 61 can be firmly fixed to the shaft 31.

The sensor magnet 62 has a circular ring shape. The sensor magnet 62 is retained by the sensor yoke 61. More specifically, the sensor magnet 62 can be fitted onto the outer wall portion 61b from the radially outer side. Accordingly, the sensor magnet 62 is indirectly fixed to the shaft 31 via the sensor yoke 61. Further, the sensor magnet 62 may be directly fixed to the shaft 31.

The rotation sensor 64 radially faces the sensor magnet 62 across a gap. As the rotation sensor 64, for example, a plurality of hall ICs can be used. The rotation sensor 64 detects magnetic flux of the sensor magnet 62. A rotation position of the rotor 30 is calculated in a controller or the like (not illustrated) which controls the motor 10 by using the detected magnetic flux. Further, the rotation sensor 64 may axially face the sensor magnet 62 across a gap.

The manufacturing method of the rotor 30 in the present exemplary embodiment includes a first groove forming process S0, a plate member forming process S1, a laminated body forming process S2, a providing process S3, a molding body forming process S4, a separating process S5, a second groove forming process S6, a sensor magnet providing process S7 and a permanent magnet arranging process S8. The manufacturing method of the rotor 30 in the present exemplary embodiment includes the manufacturing method of the rotor core 32, and the manufacturing method of the rotor core 32 includes the first groove forming process S0 to the second groove forming process S6.

As shown in FIG. 5, in the first groove forming process S0, the first grooves 38 are formed on the outer circumferential surface of the shaft 31a (left view of FIG. 5). The first grooves 38 are formed on the outer circumferential surface of the shaft 31a, for example, by a cutting process.

In the plate member forming process S1, a plate member 70a (refer to FIG. 7) is formed. The plate member 70a is a member having a plate shape. The plate member 70a has a substantially square shape in the planar view. Four corner portions of the plate member 70a are chamfered. The plate member 70a has a scrap portion 71 and the core plate portion 37. The scrap portion 71 has a substantially annular shape and has a center hole 71a which is penetrated in the axial direction.

Further, the description that "any member has an annular shape" includes the case in which any member has a shape, such that the any member continues on an entire circumference. That is, the annular shape contains the circular ring shape, an ellipse annular shape, an angle annular shape, a rectangular annular shape or the like. Further, the description that "any member has a substantially annular shape" includes the case in which any member has a shape, such that the any member continues on an entire circumference or any member has a shape, such that the any member discontinues on a portion of an entire circumference.

The scrap portion 71 has a scrap portion main body 71b, extension portions 72, first connection portions 72b and fixing portions 73. The scrap portion main body 71b is an annular portion which prescribes the center hole 71a in the scrap portion 71. The extension portion 72 extends radially inward from an inner edge of the center hole 71a. The extension portion 72 has an extension portion main body 72a and the first connection portion 72b. The extension portion main body 72a is connected to the scrap portion main body 71b and radially extends from the scrap portion main body 71b.

Figure 7:
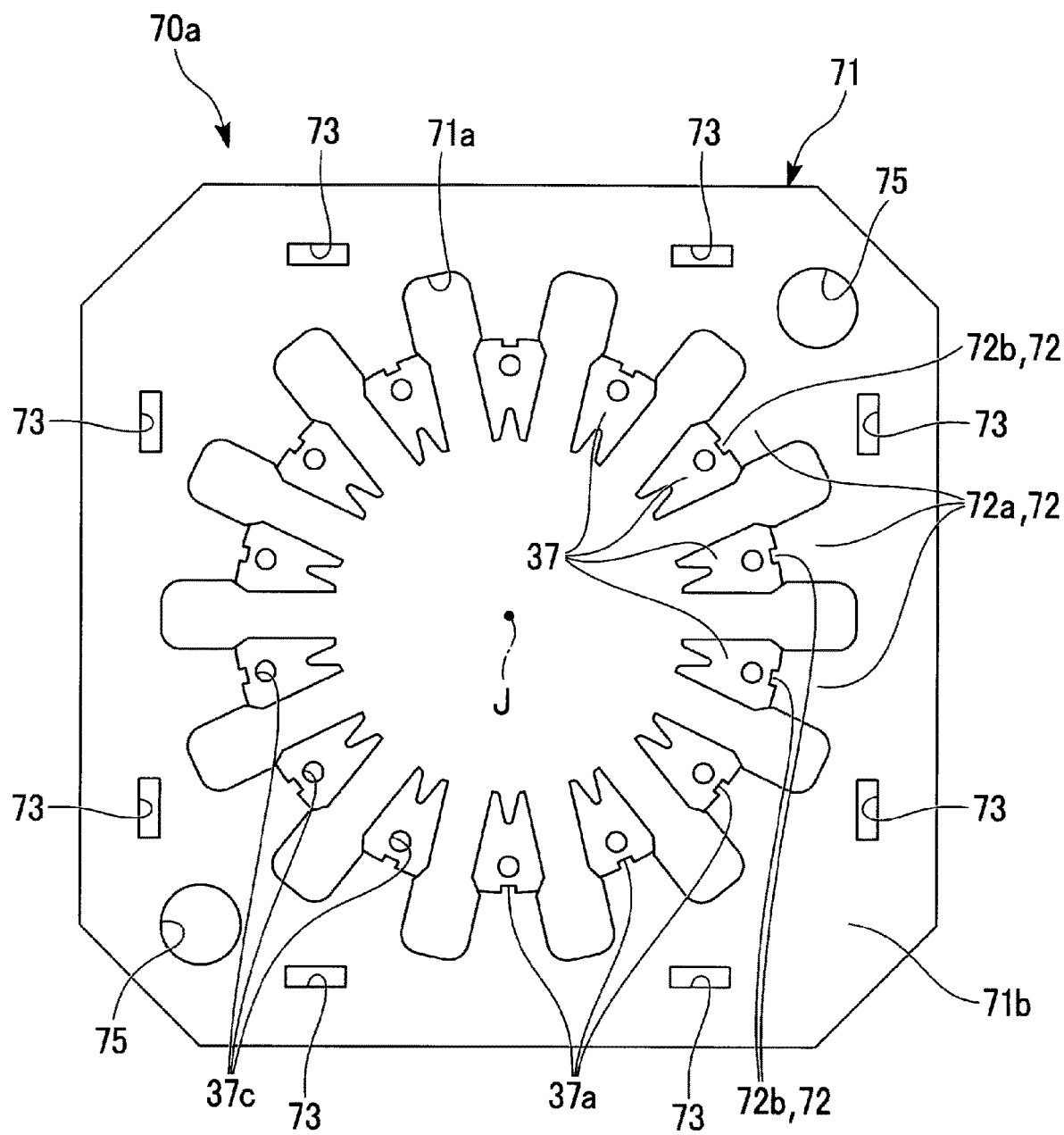
FIG. 7 is a top view which illustrates a plate member in the present exemplary embodiment.

In FIG. 7, the first connection portion 72b is a convex portion which is convex in the radial direction. More specifically, the first connection portion 72b is the convex portion which is convex radially inward from the extension portion main body 72a. The first connection portion 72b has a substantially rectangular shape in the planar view. The first connection portion 72b has a shape which corresponds to a shape of the second connection portion 37a.

In the plate member 70a, the core plate portion 37 is arranged to continue with the scrap portion 71 on a radially inner side of the scrap portion 71. The second connection portion 37a which is the concave portion may be fitted into the first connection portion 72b which is the convex portion, so that the core plate portion 37 is connected to the scrap portion 71. As described above, in the second connection portion 37a, the circumferential width on the radially inner side than the radially outer end portion of the second connection portion 37a is wider than the circumferential width of the radially outer end portion of the second connection portion 37a. For that reason, the first connection portion 72b can be prevented from being radially moved. With this, the core plate portion 37 is prevented from being misaligned with the scrap portion 71 by being radially moved. Further, when the core plate portion 37 is axially moved with the connection portion which is a fulcrum, a radially inner end surface of the first connection portion 72b and a radially outer end surface of the second connection portion 37a are interfered, so that the core plate portion 37 is prevented from being moved in the axial direction of the core plate portion 37. With this, the core plate portion 37 can be prevented from being moved in the axial direction of the core plate portion 37 and from being misaligned with the scrap portion 71.

As described above, the inner side surface of the second connection portion 37a is circumferentially inclined, such that the circumferential width is increased radially inward from the radially outer side. For that reason, when the core plate portion 37 is axially moved with the connection portion which is the fulcrum, a side surface of the first connection portion 72b and the inner side surface of the second connection portion 37a are interfered, so that the core plate portion 37 is prevented from being moved in the axial direction of the core plate portion 37. Accordingly, the core plate portion 37 can be further prevented from being moved in the axial direction and from being misaligned with the scrap portion 71.

Figure 10:
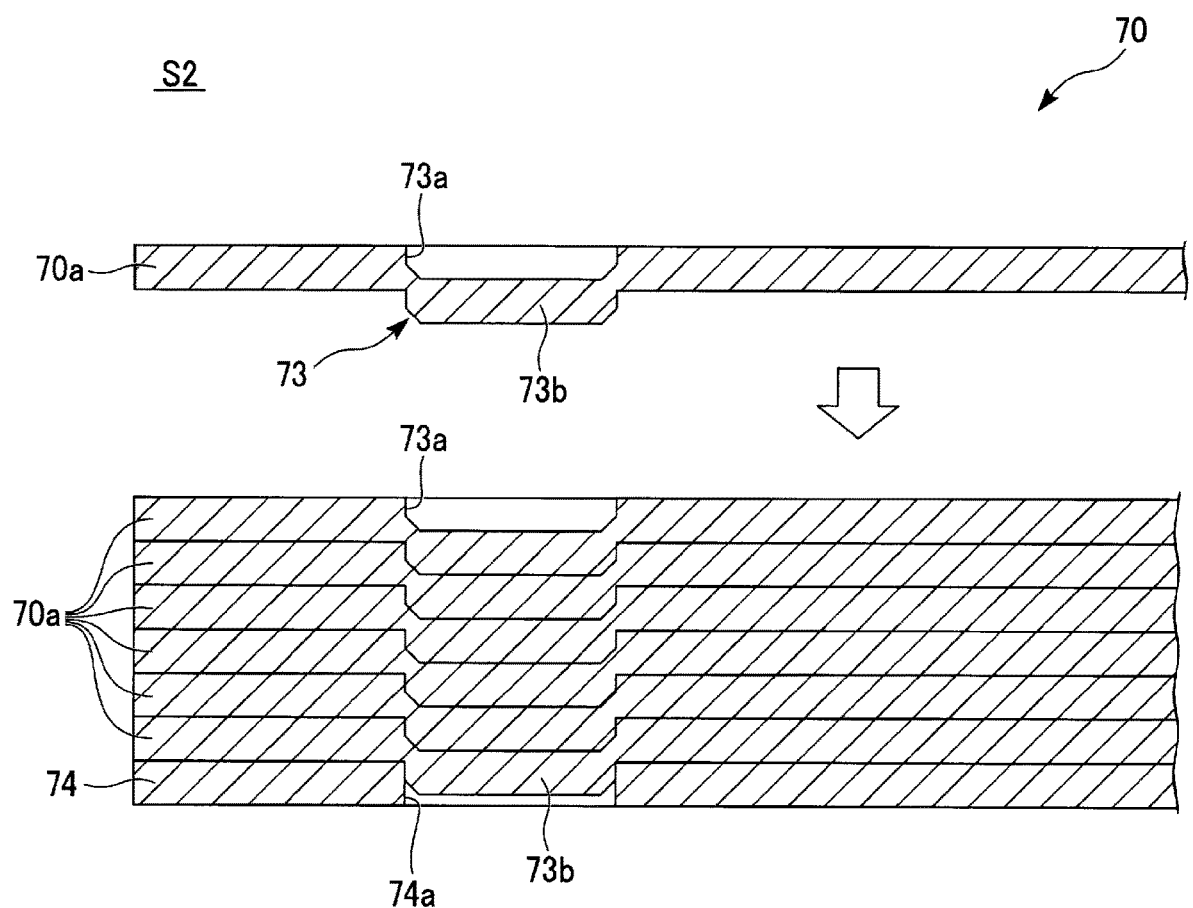
FIG. 10 is a cross-sectional view which illustrates a portion of a laminated body forming process S2 in the manufacturing method of the rotor core in the present exemplary embodiment.

The fixing portions 73 are plurally arranged (eight in FIG. 7) on the scrap portion main body 71b. The respective fixing portions 73 are desirably arranged, such that the respective fixing portions having their centers on the center axis J have symmetrical figure for a point. The fixing portion 73 has, for example, a rectangular shape in the planar view. As shown in FIG. 10, the fixing portion 73 has a recessed portion 73a which is concaved downward and a protruded portion 73b which is protruded downward. The recessed portion 73a and the protruded portion 73b are overlapped in the axial direction.

As shown in FIG. 7, among the four corners of the scrap portion main bodies 71b, in two positions which face each other to be symmetric with respect to the center axis J, pin holes 75 are respectively formed. In this exemplary embodiment, the number of the pin holes 75 is two. The pin holes 75 penetrate the plate member 70a in the axial direction.

The plate member forming process S1 includes a connection portion forming process S1a, a fitting process S1b, a contour forming process S1c and a fixing portion forming process S1d.

Figure 8:
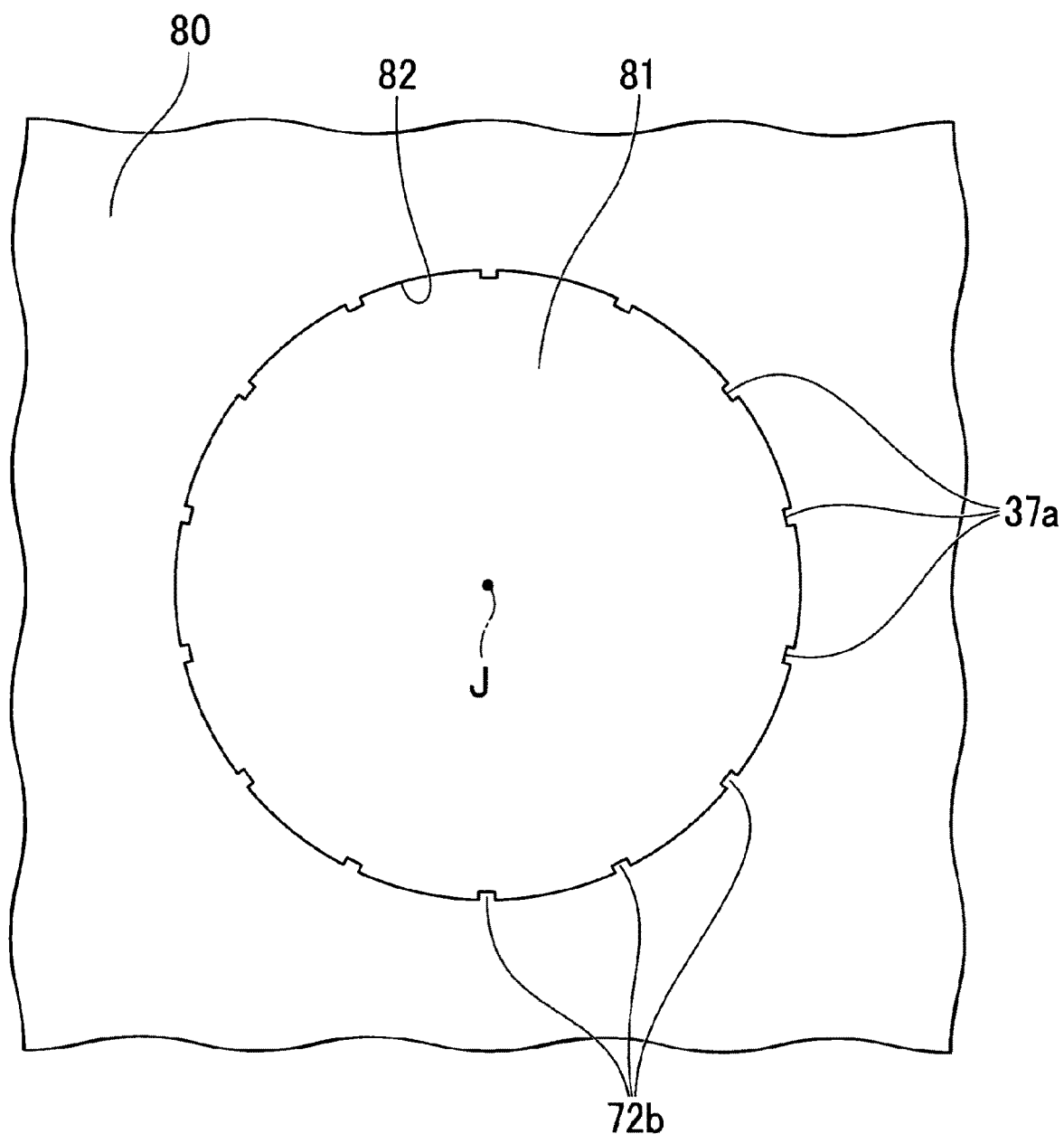
FIG. 8 is a top view which illustrates a portion of a plate member forming process S1 in a manufacturing method of a rotor core in the present exemplary embodiment.

In the connection portion forming process S1a shown in FIG. 8, the first connection portion 72b and the second connection portion 37a are formed. In the connection portion forming process S1a shown in FIG. 8, an electromagnetic steel plate 80 in a strip form is punched, and a disc portion 81 and a through hole 82 are formed. The disc portion 81 has a circular shape in the planar view. The disc portion 81 has the plurality of second connection portions 37a on an outer side edge. The plurality of second connection portions 37a are circumferentially arranged on the outer side edge of the disc portion 81 at regular intervals.

As the disc portion 81 is punched from the electromagnetic steel plate 80, the through hole 82 is formed. The through hole 82 has the plurality of first connection portions 72b on an inner edge. The plurality of first connection portions 72b are circumferentially arranged on the inner edge of the through hole 82 at regular intervals. The first connection portions 72b are formed by punching the electromagnetic steel plate 80 along the second connection portion 37a.

In the fitting process S1b, the first connection portions 72b and the second connection portions 37a are fitted together. In the fitting process S1b shown in FIG. 8, the disc portion 81 is fitted into the through hole 82. With this, the first connection portions 72b and the second connection portions 37a are fitted together. In the fitting process S1b, by fitting the disc portion 81 into the through hole 82, the plurality of first connection portions 72b and the plurality of second connection portions 37a can be fitted together at once. For that reason, the first connection portions 72b and the second connection portions 37a can be easily fitted together.

Figure 9:
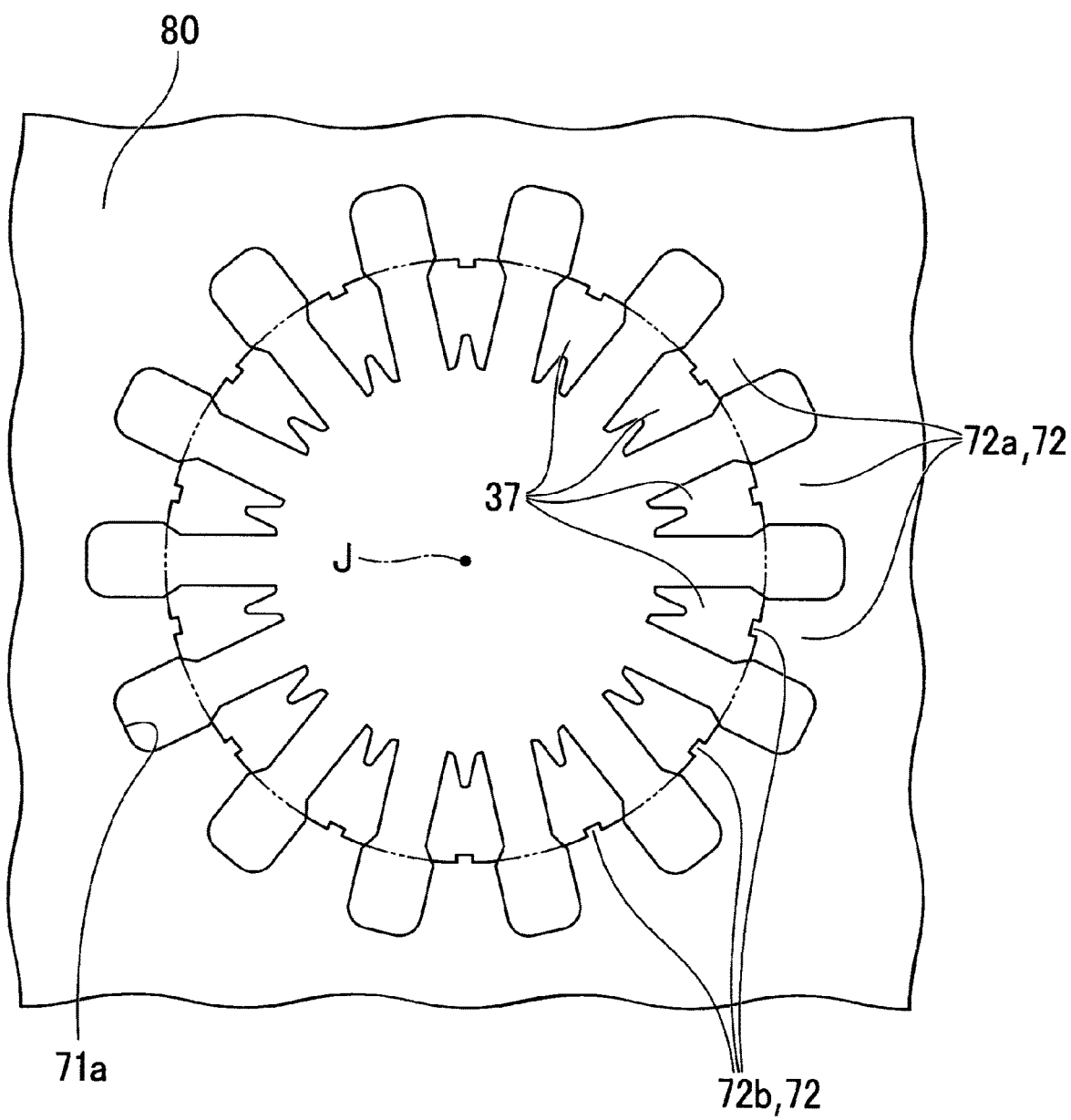
FIG. 9 is a top view which illustrates a portion of the plate member forming process S1 in the manufacturing method of the rotor core in the present exemplary embodiment.

The contour forming process S1c shown in FIG. 9, a portion of the electromagnetic steel plate 80 is punched, and a contour of the core plate portion 37 and a contour of the extension portion main body 72a are formed. Specifically, portions that do not become the core plate portions 37 of the disc portion 81 are punched and then separated. In the contour forming process S1c, the core plate portions 37, the extension portions 72 and the center hole 71a are formed. The core plate portions 37 are formed while being connected to the extension portion 72. That is, in the plate member forming process S1, the core plate portions 37 are connected to the extension portion 72 by fitting the first connection portions 72b and the second connection portions 37a.

When the rotor core 32 can be used in a relatively small middle-sized motor or small-sized motor, the plurality of laminated core plate portions 37 easily disperses if the first connection portions 72b and the second connection portions 37a are formed after the contour of the core plate portions 37 are formed, as compared to the case in which the rotor core 32 can be used in a large-sized motor. As a result, it is difficult to fit the plurality of first connection portions 72b and the plurality of second connection portions 37a together. For that reason, in manufacturing the relatively small middle-sized motor or small-sized motor, it is proper to perform the connection portion forming process S1a and the fitting process S1b before the contour forming process S1c when the rotor core 32 can be used therein.

In the fixing portion forming process S1d, the fixing portions 73 are formed. Specifically, a portion of the electromagnetic steel plate 80 is axially caulked by press process, and the fixing portions 73 are formed. The fixing portions 73 are portions to fix the plate members 70a laminated in the axial direction in the laminated body forming process S2. Positions in which the fixing portions 73 are arranged become the scrap portion 71. For that reason, it is not necessary to provide the fixing portions to the core plate portions 37. With this, it is possible to prevent the magnetic flux, which passes the core pieces 34N and 34S, from being deformed and to prevent magnetic characteristics of the motor 10 from worsen.

After the fixing portion forming process S1d is performed, the electromagnetic steel plate 80 is punched along a contour of the plate member 70a shown in FIG. 7. With this, the plate member 70a is formed.

Further, the plate member forming process S1 includes a process of forming the core plate portion through holes 37c and a process of forming the pin holes 75. The process of forming the core plate portion through holes 37c and the process of forming the pin holes 75 may be performed in any orders within the plate member forming process S1. The process of forming the core plate portion through holes 37c is performed, for example, before the contour forming process S1c is performed.

As shown in FIG. 10, in the laminated body forming process S2, a laminated body 70 is formed by laminating the plate members 70a. The plate members 70a are laminated in sequence on the laminated plate member 70a. At this time, the protruded portion 73b of the plate member 70a to be laminated can be fitted into the recessed portion 73a of the laminated plate member 70a. With this, the plate members 70a which are laminated in the axial direction are fixed to each other.

In the plate member forming process S1 of the present exemplary embodiment, the punched plate members 70a are laminated in sequence. That is, the plate member forming process S1 and the laminated body forming process S2 are performed in parallel. With this, the laminated body 70 can be efficiently formed. Further, after the plate member 70a which defines the laminated body 70 are entirely formed in the plate member forming process S1, the laminated body forming process S2 may be performed.

A plate member 74 is the plate member 70a which is arranged on a lowest side among the plate members 70a which define the laminated body 70. The plate member 74 has a plate member through hole 74a as a fixing portion which penetrates the plate member 74 in the axial direction. The protruded portion 73b of the plate member 70a laminated on an upper side of the plate member 74 can be fitted into the plate member through hole 74a. As the laminated body 70 has the plate member 74, it is possible to prevent the neighboring laminated bodies 70 from being fixed by the fixing portion 73 when the rotor core 32 is formed by laminating the plurality of laminated bodies 70.

By laminating plural sheet of the plate members 70a, the core plate portions 37 are laminated. With this, the core pieces 34N and 34S are formed. That is, the laminated body 70 has the core pieces 34N and 34S.

Figure 11:
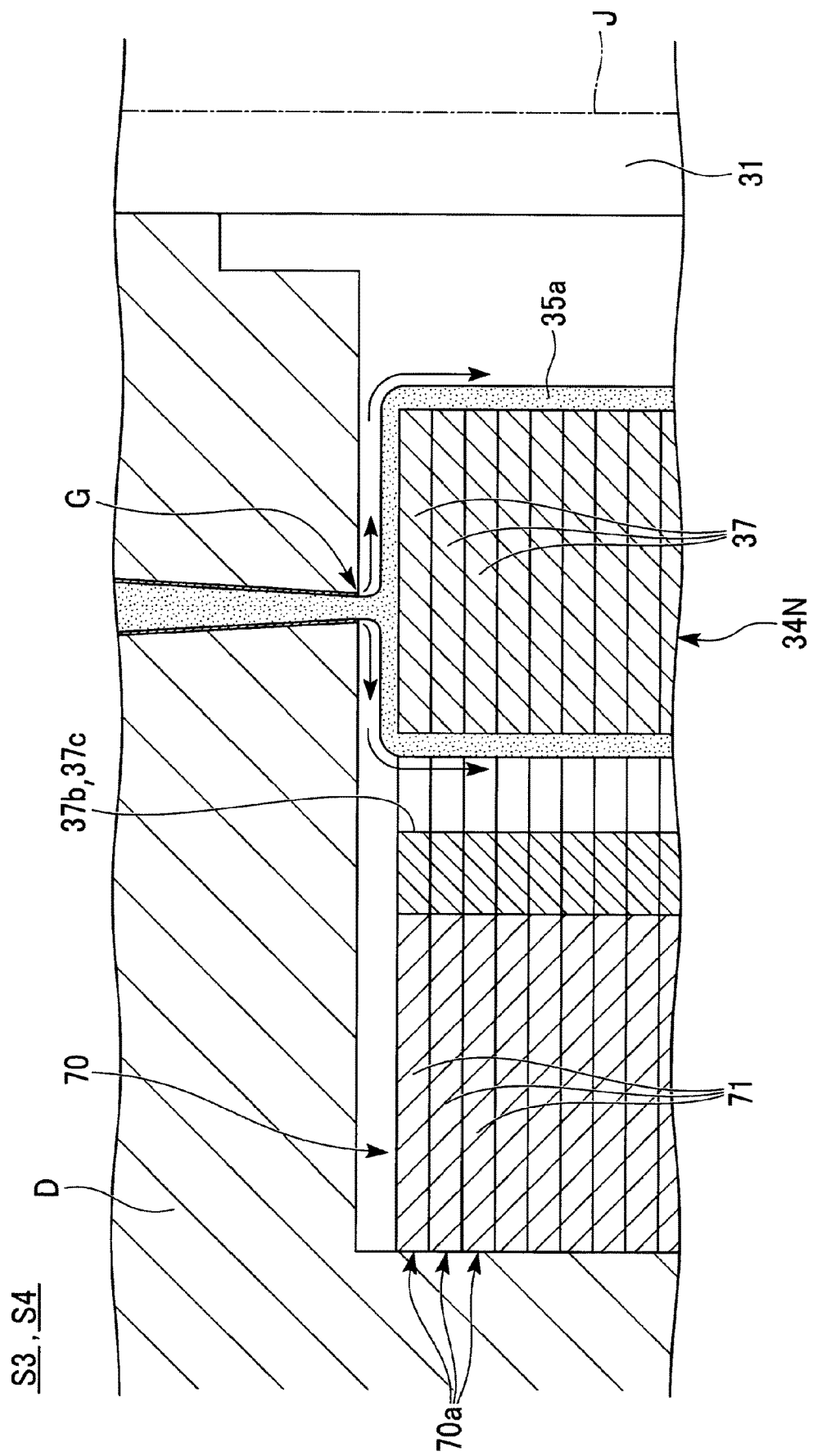
FIG. 11 is a top view which illustrates a portion of a providing process S3 and a molding body forming process S4 the manufacturing method of the rotor core in the present exemplary embodiment.

As shown in FIG. 11, in the providing process S3, the laminated body 70 and the shaft 31 are provided in a mold D. An order to provide the laminated body 70 and the shaft 31 in the mold D is not particularly limited, the laminated body 70 may be firstly provided, the shaft 31 may be firstly provided, and the laminated body 70 and the shaft 31 may be concurrently provided.

As an example, the laminated body 70 is firstly provided in the mold D. At this time, as shown in FIG. 7, the scrap portion 71 has the extension portion 72. For that reason, a portion of the mold D or a jig can be arranged in respective gaps between the circumferentially neighboring extension portions 72. With this, the laminated body 70 can be stably retained in the mold D.

Next, the shaft 31 is inserted in the center hole 71a of the laminated body 70 provided in the mold D, and a position of the shaft 31 is determined with respect to the mold D by jig or the like. Desirably, the mold D has a concave portion or a hole, in which a leading end portion of the shaft 31 is inserted, in a corresponding position to the shaft 31 in the axial direction. The position of the shaft 31 is determined with respect to the mold D by disposing in the concave portion or the hole.

Figure 12:
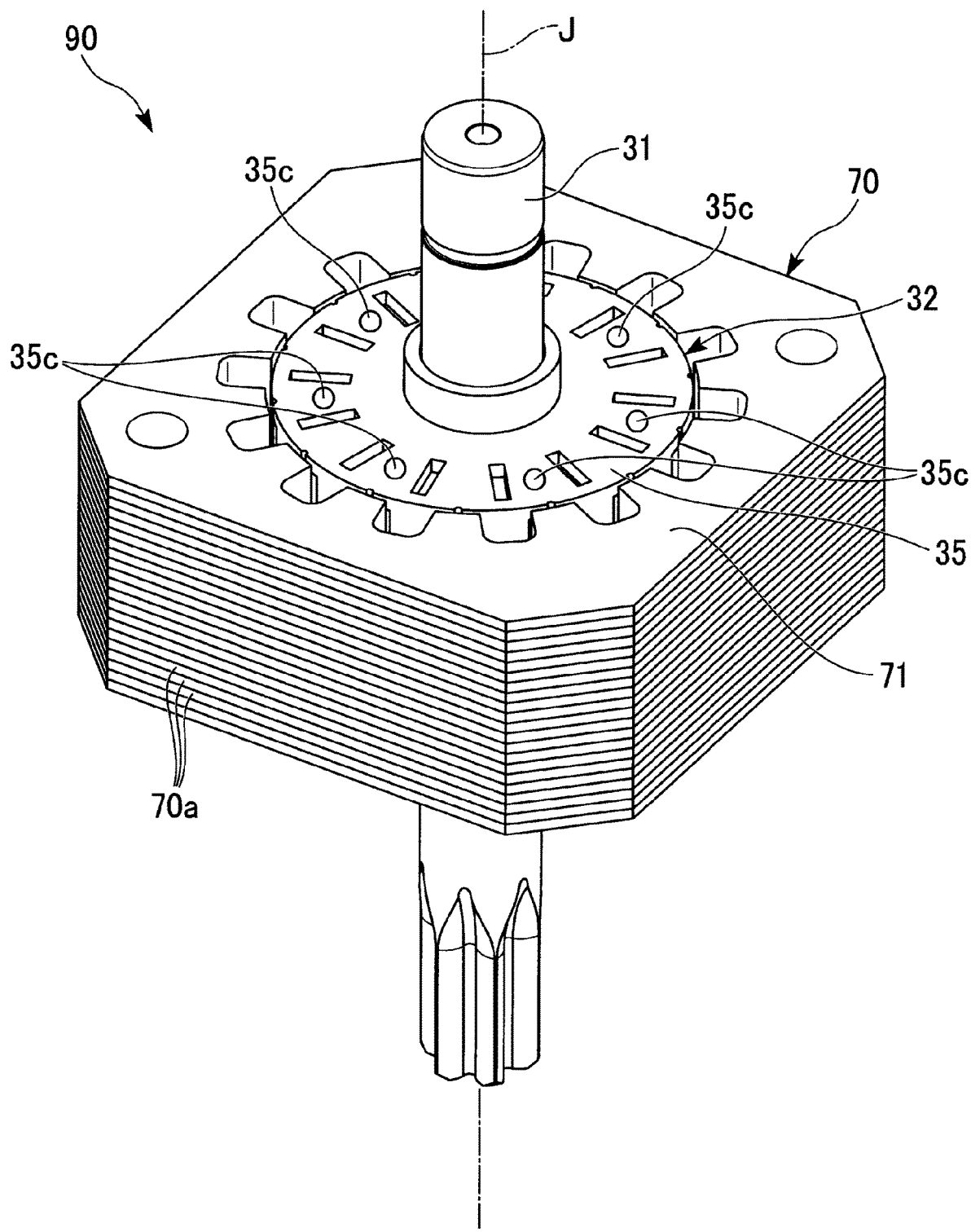
FIG. 12 is a perspective view which illustrates a molding body in the present exemplary embodiment.

In the molding body forming process S4, the molten resin or the nonmagnetic material is flown in the mold D, the filling portion 35 is formed, and the molding body 90 shown in FIG. 12 is formed. The molding body 90 is formed by connecting the laminated body 70 and the shaft 31 with the filling portion 35. In the following descriptions, a case in which the filling portion 35 is made of the resin and the molten resin 35a is flown in the mold D will be explained.

As shown in FIG. 11, in the molding body forming process S4, the resin 35a is flown via a gate G in the mold D in which the laminated body 70 and the shaft 31 are provided. The gate G axially faces the core pieces 34N across a gap. For that reason, the resin 35a flown through the gate G is injected toward an upper surface of the core piece 34N. With this, a pressure is added from an upper side of the core piece 34N by an injection pressure of the resin 35a injected from the gate G, so that the laminated core plate portions 37 can be closely contacted together. Accordingly, it is possible to prevent the resin 35a from being introduced between the core plate portions 37 and to prevent the gap of the neighboring core plate portions 37 from being increased. As a result, a dimensional accuracy of the core pieces 34N and 34S can be improved.

In FIG. 11, the gate G is arranged above the core piece 34N. A position of the gate G is radially different from the position of the core piece through hole 37b. For that reason, a pressure on an upper surface of the core piece 34 is added by the resin 35a injected from the gate G into the mold D. In FIG. 11, the gate G is arranged on the radially inner side than the core piece through hole 37b.

When the gate G is arranged on the radially outer side than the core piece through hole 37b, the resin 35a, which is flown on a lower side of the core piece 34N through the core piece through hole 37b, is flown on the radially inner side of the core piece 34N. With this, the resin 35a may be filled from a lower side toward an upper side on the radially inner side of the core piece 34N. As a result, the resin 35a is introduced between the core plate portions 37 by the resin 35a which moves from the lower side toward the upper side, so that the laminated core plate portion 37 may be separated in a vertical direction.

In this behalf, by disposing the gate G on the radially inner side than the core piece through hole 37b, the resin 35a introduced from the gate G into the mold D is divided into two, that is, the resin 35a introduced into the core piece through hole 37b from the upper side thereof and the resin 35a introduced on the radially inner side of the core piece 34N from the upper side thereof. With this, the resin 35a contacted to the core piece 34N is prevented from being moved from the lower side toward the upper side, and thereby the laminated core plate portions 37 are prevented from being separated in the vertical direction. With this, the dimensional accuracy of the core pieces 34N and 34S can be improved.

In the laminated body 70, the plurality of plate members 70a are fixed to the fixing portions 73. That is, the plate members 70a are fixed to positions of the radially outer side of the plate members 70a. When injection molding is performed, the injection pressure of the resin 35a is added to a portion on the radially inner side of the plate member 70a. For that reason, both radially end sides of the plate member 70a are pressed. As a result, the laminated plate members 70a can be prevented from being separated in the vertical direction.

In the molding body forming process S4, the portion of the filling portion 35 can be arranged in the core piece through hole 37b by flowing the resin 35a in the core piece through hole 37b. With this, as described above, the core plate portions 37 can be fixed to each other by the filling portion 35.

In the present exemplary embodiment, a plurality of gates G are arranged in the mold D. The plurality of gates G are arranged in the circumferential direction at regular intervals. For that reason, the resin 35a can uniformly flow in the mold D in the entire circumferential direction. As a result, a dimensional accuracy of the filling portion 35 can be improved. The gate marks 35c of the filling portion 35 are arranged in positions in which the gates G are arranged on an upper surface of the filling portion 35 in the molding body forming process S4.

In the present exemplary embodiment, the first groove forming process S0 is performed before the providing process S3 is performed. For that reason, the resin 35a flown in the mold D in the molding body forming process S4 is introduced into the first grooves 38. With this, the portion of the filling portion 35 is arranged in the first groove 38. Accordingly, the shaft 31 and the filling portion 35 can be firmly fixed.

In the separating process S5, the scrap portion 71 and the core plate portion 37 are separated. In the separating process S5, the fitting between the first connection portions 72b and the second connection portions 37a are removed, and the scrap portion 71 and the core plate portion 37 are easily separated.

Specifically, the molding body 90 is separated from the mold D and is provided in a press machine. Thereafter, a portion including the shaft 31, the filling portion 35 and the core pieces 34N and 34S is punched from the molding body 90 along an interface between the scrap portion 71 and the core plate portion 37 by the press machine. The punched portion including the shaft 31, the filling portion and the core pieces 34N, 34S does not provide, for example, the second grooves 39, and thereby it is different from the rotor core 32 shown in FIG. 3.

Further, in the present disclosure, "separating the scrap portion and the core plate portion" is intended to mean dividing and separating the scrap portion and the core plate portion, but does not particularly limit the means thereof. For example, the description that "the scrap portion and the core plate portion are separated" includes the case in which a boundary between the scrap portion and the core plate portion are cut and the case in which the boundary between the scrap portion and the core plate portion are folded to be separated.

Other portion (that is, the scrap portion 91) than the shaft 31, the filling portion 35 and the core pieces 34N and 34S inside the molding body 90 is removed. As described above, the fixing portions 73 which fixes the plate members 70a to each other is provided in the scrap portion 71. After the molding body forming process S4 is performed, the core plate portions 37 are fixed by the filling portions 35 to each other. For that reason, even though the scrap portion 71 is removed, the core plate portions 37 are not separated from each other, and thereby the form of the core pieces 34N and 34S is maintained.

In the second groove forming process S6, the second grooves 39 are formed. In the process S6, on the shaft 31 of the punched portion including the shaft 31, the filling portion 35 and the core pieces 34N and 34S in the separating process S5, the second grooves 39 are formed by the cutting process, a stacking process or the like.

Here, for example, the second grooves 39 are provided in positions where the shaft 31 is retained by the mold D. When the second grooves 39 are formed before the molding body forming process S4 is performed, the resin 35a can flow into the second grooves 39 and the sensor yoke 61 may not be firmly fixed by the shaft 31.

With this, the second groove forming process S6 of the present exemplary embodiment is performed after the molding body forming process S4 is performed. For that reason, in the molding body forming process S4, the resin 35a may not flow into the second grooves 39. With this, the sensor yoke 61 can be firmly fixed to the shaft 31.

When the plurality of second grooves 39 are circumferentially formed on the punched portion including the shaft 31, the filling portion 35 and the core pieces 34N and 34S in the separating process S5, the portion between the second grooves 39 in the circumferential direction may be deformed by forming the second groove 39, and the outer diameter thereof may be increased. For example, when the mold D retains the lower portion of the shaft 31 than the second grooves 39, the shaft 31 passes through a hole within the mold D. At this time, if there is a portion where an outer diameter on the upper portion of the shaft 31 is increased, the hole of the mold D and the shaft 31 are interposed, so that the shaft 31 may not be appropriately provided within the mold D. Further, when the outer diameter of a position where the second grooves are formed becomes shorter than other portions, a manufacturing cost for the shaft 31 may be increased.

With this, the second groove forming process S6 of the present exemplary embodiment is performed after the molding body forming process S4 is performed. For that reason, the mold D and the shaft 31 can be prevented from interfering with each other while the outer diameter of the shaft 31 is substantially uniform in the entire axial direction. Accordingly, the shaft 31 can be appropriately provided within the mold D while the manufacturing cost for the shaft 31 can be prevented from being increased.

In the present exemplary embodiment, when the filling portion 35 is formed, the plurality of core pieces 34N and 34S do not need to be respectively retained by the mold D, the jig or the like. For that reason, the plurality of core pieces 34N and 34S can be easily provided within the mold D. With this, the manufacturing processes for the rotor core 32 can be simplified, and the rotor core 32 can be easily manufactured.

In the sensor magnet providing process S7, the sensor magnet 62 is attached to a position where the second groove 39 is formed on the shaft 31. Specifically, in the process S7, the sensor yoke 61 is pressed in the position where the second groove 39 is formed on the shaft 31. The sensor magnet providing process S7 is performed after the second groove forming process S6 is performed.

Further, when the sensor magnet 62 is attached to the position where the second groove 39 is formed on the shaft 31, the sensor magnet 62 may be directly fixed to the position where the second groove 39 is formed, and a member which retains the sensor magnet 62 may be fixed to the position where the second groove 39 is formed.

In the permanent magnet arranging process S8, the permanent magnets 33A and 33B are arranged. In the process S8, the permanent magnets 33A and 33B are inserted into the permanent insertion cavities (not illustrated) provided on the lower surface of the filling portion 35.

While the process S8 continues, the rotor 30, the stator 40 and the bearings 51 and 52 are accommodated in the housing 20. With this, the motor 10 including the rotor 30 can be manufactured.

The present disclosure is not limited to the exemplary embodiment, and other configurations may be adapted. In the description below, the description of like configurations may be omitted by attaching appropriately like references or the like.

The connection portion forming process S1a and the fitting process S1b may be performed after the contour forming process S1c is performed. That is, the first connection portions 72b and the second connection portions 37a may be formed after the contour of the core plate portions 37 and the contour of the extension portions 72 are formed, and the first connection portions 72b and the second connection portions 37a may be fitted. In the large-sized motor, a size of the rotor core 32 needs to be large as compared to the small-sized motor and the middle-sized motor. In this case, curvature of the disc portion 81 is increased, and it is difficult to securely fit the plurality of first connection portions 72b and the plurality of second connection portions 37a together. For that reason, in the method, in which the connection portion forming process S1a and the fitting process S1b are performed after the contour forming process S1c is performed, the rotor core 32 is suitable for manufacturing the relatively large large-sized motor.

In the plate member forming process S1, the connection forming process S1a and the fitting process S1b may not be provided. That is, the first connection portions 72b and the second connection portions 37a may not be provided. In this case, the scrap portion 71 and the core plate portion 37 may be separated by cutting the boundary between the scrap portion 71 and the core plate portion 37 in the separating process S5.

The scrap portion 71 may not have the extension portion 72. In this case, the first connection portions 72b are provided on an inner circumference of the scrap portion main body 71b.

The fixing portion forming process S1d may be performed in any order in the plate member forming process S1. Further, the plate member forming process S1 may not include the fixing portion forming process S1d. In this case, it is preferable to place a process of fixing the laminated plate members 70a to each other by laser welding or the like, for example, between the laminated body forming process S2 and the providing process S3. Further, the configuration of the fixing portion 73 is not particularly limited thereto as long as the plate members 70a can be fixed together.

After the molding body forming process S4 is performed, the separating process S5 may be performed without taking out the molding body 90 from the mold D. In this case, the portion including the shaft 31, the filling portion 35 and the core pieces 34N and 34S is directly separated from the molding body 90 formed inside the mold D. Manufacturing man-hours of the rotor core 32 can be decreased by this method.

The first groove forming process S0 may be performed in any order as long as performed before the molding body forming process S4. More specifically, the first groove forming process S0 may be performed, for example, between the plate member forming process S1 and the laminated body forming process S2 or between the laminated body forming process S2 and the providing process S3. Further, the manufacturing method of the rotor core 32 in the present exemplary embodiment may not include the first groove forming process S0. In this case, the shaft 31 in which the first grooves 38 are formed may be used in advance.

Instead of the second groove forming process S6, a process of forming a protrusion, which is protruded radially outward from the outer circumferential surface of the shaft 31, may be performed. In this case, the protrusion serves to press it, and thereby the sensor yoke 61 is firmly fixed to the shaft 31 by the press.

The second groove forming process S6 may be performed before the molding body forming process S4 is performed. In this case, it is desirable to suppress introduction of the resin 35a into the second grooves 39 by deformation of the shape of the mold D, disposal of the jig or the like.

The permanent magnet arranging process S8 may be performed in any order as long as performed after the molding body forming process S4. The permanent magnet arranging process S8 may be performed while the providing process S3 is performed. That is, in the providing process S3, the permanent magnets 33A and 33B are arranged in the mold D and are molded with the laminated body 70 together.

The shape of the second connection portions 37a is not particularly limited thereto as long as a portion where the circumferential dimension on the radially inner side than the radially outer end portion of the second connection portion 37a is bigger than the radially inner end portion is formed. The shape of the second connection portions 37a may be, for example, the shapes shown in FIG. 13 and FIG. 14.

Figure 13:
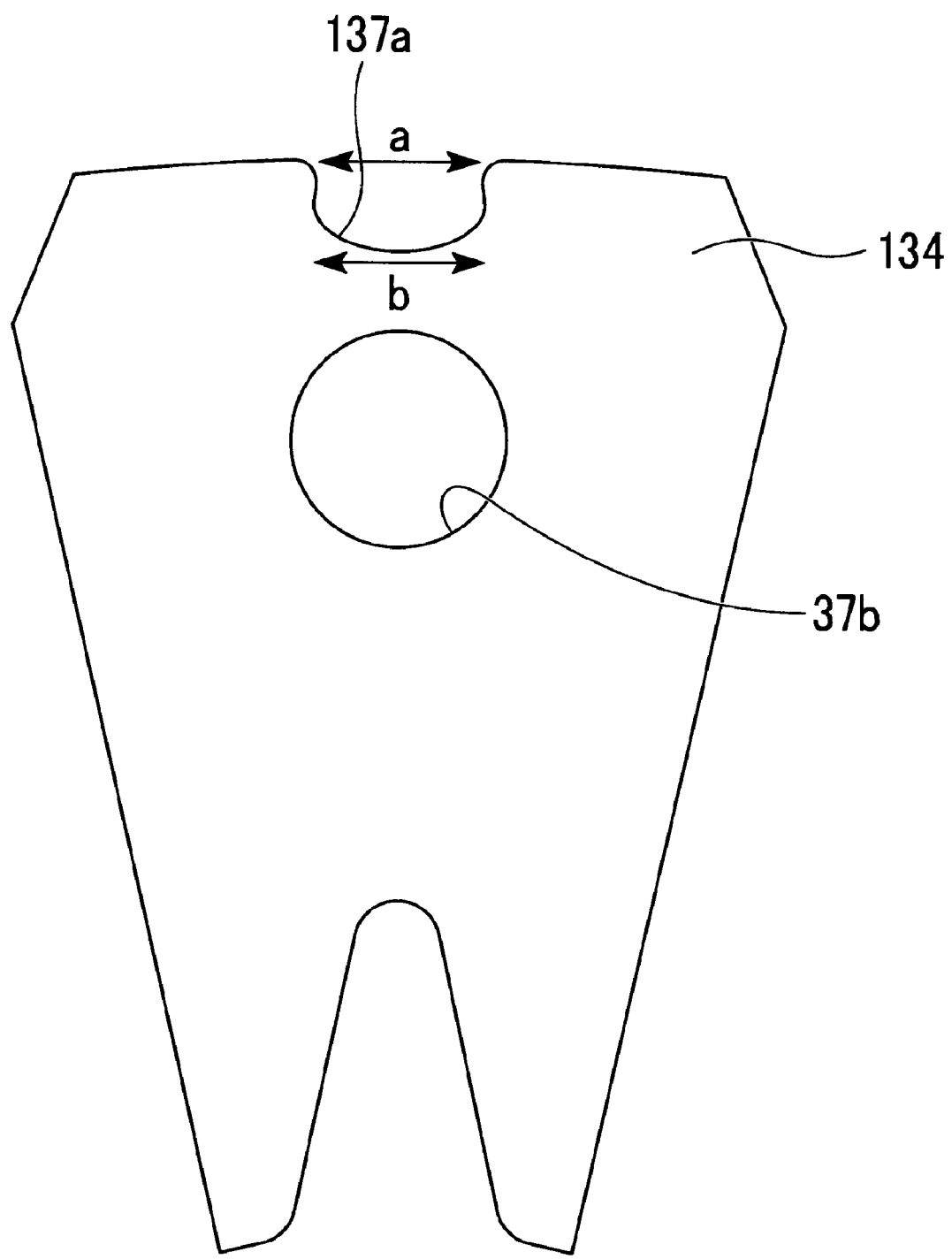
FIG. 13 is a top view which illustrates another example of the core piece in the present exemplary embodiment.

As shown in FIG. 13, in a core piece 134, an inner side surface of a second connection portion 137a, which is a concave portion, is a curved surface. At least a portion of the inner side surface of the second connection portion 137a has a circular arc shape in the planar view. In FIG. 13, a size b is a circumferential size at a radially substantial center of the second connection portion 137a. A circumferential size a on a radially outer end portion of the second connection portion 137a is smaller than the size b.

Figure 14:
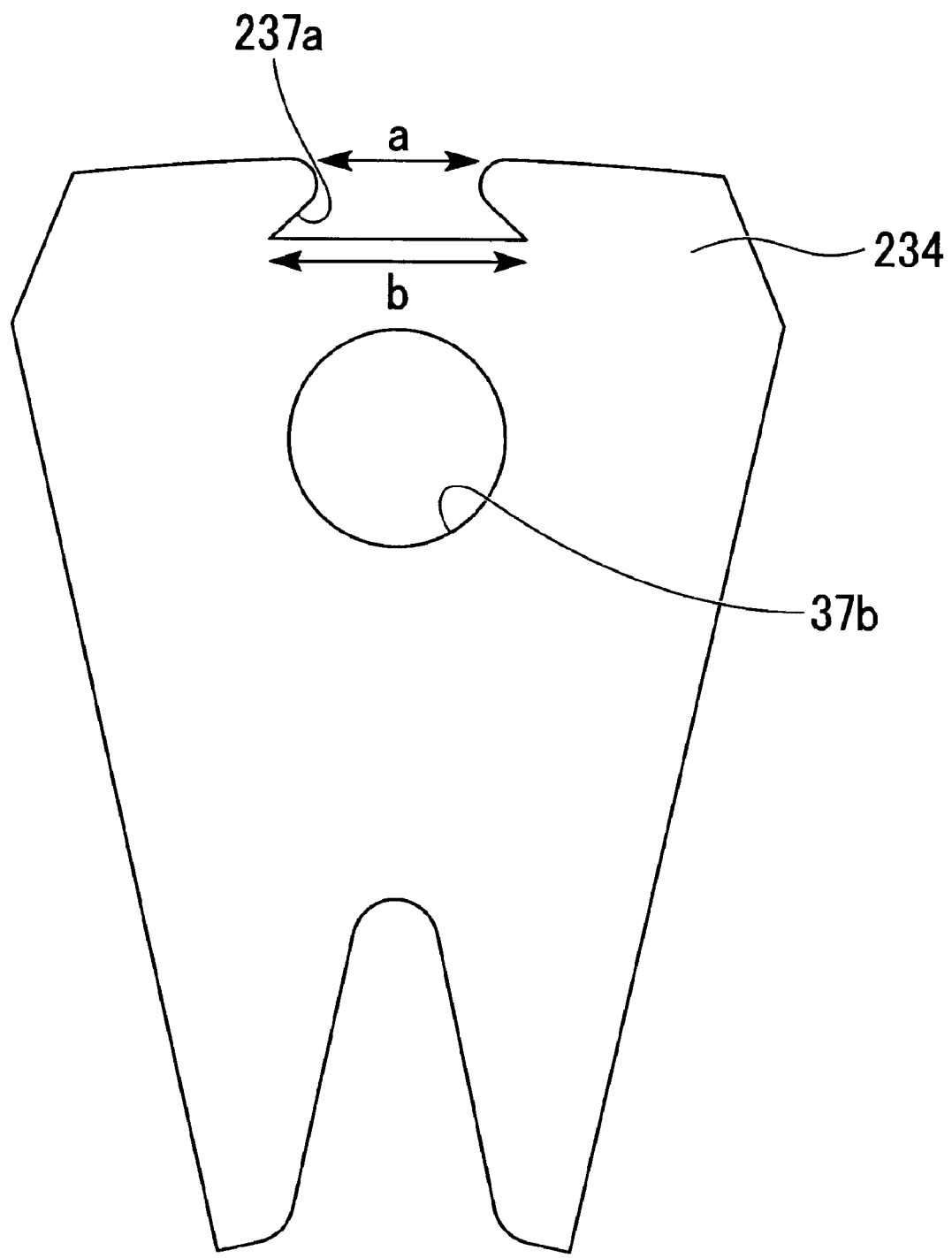
FIG. 14 is a top view which illustrates another example of the core piece in the present exemplary embodiment.

In a core piece 234 shown in FIG. 14, a second connection portion 237a, which is a concave portion, is widened radially inward on both circumferential directions. A circumferential size a on a radially outer end portion of the second connection portion 237a is smaller than a circumferential size b on a radially inner end portion of the second connection portion 237a.

A shape of the second connection portion 37a may have other shapes than the above shape, for example, a similar shape to triangle flask, a similar shape to round flask or an anchor shape in the planar view. A contour of the inner side surface of the second connection portion 37a may be a portion of a polygon or a circular shape in the planar view.

The first connection portion 72b may be a concave portion which is concaved on the radially outer side. In this case, the second connection portion 37a is a convex portion which is convex on the radially outer side. That is, in the plate member 70a formed in the plate member forming process S1, the scrap portion 71 may have the first connection portion 72 which is the concave portion concaved on the radially direction, and the core plate portion 37 may further have the second connection portion 37a which is the convex portion convex on the radial direction.

The above configurations can be appropriately combined with each other as long as contradiction does not occur.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

While the description above refers to particular embodiments of the present disclosure, it will be understood that many modifications may be made without departing from the spirit thereof. The accompanying claims are intended to cover such modifications as would fall within the true scope and spirit of the present disclosure.

The presently disclosed embodiments are therefore to be considered in all respects as illustrative and not restrictive, the scope of the disclosure being indicated by the appended claims, rather than the foregoing description, and all changes which come within the meaning and range of equivalency of the claims are therefore intended to be embraced therein.

What is claimed is:

1. A manufacturing method of a rotor core comprising a shaft arranged along a vertically extending center axis, a plurality of core pieces separately arranged to one another on a radially outer side of the shaft along a circumferential direction, and a filling portion which covers at least a portion of one of the plurality of core pieces,
the method comprising:
 a process S1 of forming a plurality of plate members which have substantially annular scrap portions having a center hole penetrating therethrough in an axial direction and core plate portions defining a portion of the plurality of core pieces arranged continuously with the scrap portions on a radially inner side of the scrap portions;
 a process S2 of forming a laminated body having the plurality of core pieces, by laminating the plurality of plate members;
 a process S3 of providing the laminated body and the shaft in a mold;
 a process S4 of forming a molding body by flowing a molten resin or a nonmagnetic material into the mold thereby forming the filling portion of which at least a portion is located between the plurality of core pieces; and
 a process S5 of separating the scrap portions and the core plate portions; wherein in the plurality of plate members formed in the process S1, the scrap portions have a first connection portion, which is one of a concave portion concaved radially and a convex portion convexed radially, and the core plate portions have a second connection portion, which is the other of the concave portion concaved radially and the convex portion convexed radially, the process S1 includes a process S1a of forming the first connection portion and the second connection portion and a process Sib of fitting the first connection portion and the second connection portion to each other, and in the process S5, the fitting of the first connection portion and the second connection portion is released to separate the scrap portions and the core plate portions.

2. The method according to claim 1,
wherein, the first connection portion is the convex portion convexed toward a radially inner side,
the second connection portion is the concave portion concaved toward a radially inner side, and
the second connection portion has, in the radially inner side than a radially outer end portion of the second connection portion, a portion with a bigger circumferential size than a circumferential size of the radially outer end portion of the second connection portion.

3. The method according to claim 1,
wherein, in the process S1a, a disc portion having the second connection portion on an outer side edge and a through hole having the first connection portion on an inner circumference are formed by punching an electromagnetic steel plate,
in the process S1b, the disc portion is fitted into the through hole, and
the process S1 includes a process Sic of forming a contour of the core plate portions by punching a portion of the disc portion.

4. The method according to claim 1,
wherein, the scrap portions have an extension portion which extends radially inward from an inner circumference of the center hole,
the extension portion includes the first connection portion, and in the process S1, the core plate portions are connected to the extension portion by fitting the first connection portion into the second connection portion.

5. The method according to claim 1,
wherein, in the process S2, the scrap portions includes a fixing portion which is structured to fix the plurality of plate members together, the plurality of plate members being laminated with one another in the axial direction, and
the process S1 includes a process S1d of forming the fixing portion.

6. The method according to claim 1, further comprising:
a process of forming a first groove which is formed before the process S3 and concaved radially inward on an outer circumferential surface of the shaft,
wherein the first groove is arranged in a position contacted to the filling portion.

7. The method according to claim 1,
wherein, in the process S4, the resin is flown into the mold via a gate which axially faces the plurality of core pieces across a gap.

8. The method according to claim 7,
wherein, the plurality of core pieces have a core piece through hole which axially penetrates the plurality of core pieces,
the gate is arranged in a different position from the core piece through hole in the radial direction, and
in the process S4, the resin is flown into the core piece through hole.

9. A manufacturing method of a rotor comprising a rotor core manufactured according to the manufacturing method of the rotor core described in claim 1, a plurality of permanent magnets which magnetize the plurality of core pieces, and a sensor magnet which is indirectly or directly fixed to the shaft,
the method comprising:
a process S6 of forming a second groove which is formed after the process S4 and concaved radially inward on an outer circumferential surface of the shaft; and
a process S7 of attaching the sensor magnet formed after the process S6 to a position at which the second groove is formed on the shaft.

* * * * *